United States Patent Office 3,541,036
Patented Nov. 17, 1970

3,541,036
POLYAMIC ACID POLYMER DISPERSION
Anfir Libackyj, Philadelphia, Pa., assignor to E. I. du Pont de Nemours and Company, Wilmington, Del., a corporation of Delaware
No Drawing. Continuation-in-part of application Ser. No. 533,255, Mar. 10, 1966, which is a continuation-in-part of application Ser. No. 511,976, Dec. 6, 1965. This application Mar. 30, 1967, Ser. No. 626,923
Int. Cl. C08g 51/24, 53/18
U.S. Cl. 260—29.2
7 Claims

ABSTRACT OF THE DISCLOSURE

A polyamic acid polymer ("PAP") dispersion useful for the manufacture of polyimide coatings, films and bonding layers is made up of PAP dispersed in (1) acetone, (2) dimethylphthalate, (3) a mixture of a solvent for PAP and a nonsolvent for PAP which contains a carbonyl group, a carbonyl ester group, a thiocarbonyl group or a thiocarbonyl ester group (e.g., acetone, ethyl acetate, thioacetone or methyl thionacetate), or (4) a mixture of a solvent for PAP and a ternary liquid containing about 60–87% methyl ethyl ketone, 10–30% water and 3–10% of a volatile alcohol (e.g., ethanol).

This is a continuation-in-part of patent application Ser. No. 533,255 filed Mar. 10, 1966, which was a continuation-in-part of patent application Ser. No. 511,976 filed Dec. 6, 1965 both of which are now abandoned.

This invention relates to liquid polymeric compositions, and more particularly it relates to polyamic acid polymer dispersions; the invention also concerns a process for preparing such dispersions.

"Polyamic acid polymers" are sometimes referred to in the art as polyamide acid polymers; they are also sometimes referred to simply as polyamic acids.

Polyamic acid polymers such as those disclosed in U.S. Pats. 3,179,614; 3,179,633 and 3,179,634 are generally used in the prior art in the form of a solution in an organic solvent. However, solutions of these polymers have limited utility, for example, polyamic acids have only limited or poor solubility in commercially available solvents; and the excessive viscosities of such solutions at high solids concentrations render them difficult to handle in many applications. There has been a need for a stable polyamic acid composition having higher solids content than is generally obtainable in solutions of these polymers; and there has been a particular need for a polyamic acid dispersion having not only high solids content but also the capacity to be formed into a coalescible coating or unsupported film.

The present invention provides, as a new and useful liquid polymeric composition, a dispersion of (A) a polyamic acid polymer in (B) a volatile liquid component selected from the group consisting of:

(1) acetone;
(2) dimethylphthalate;
(3) a mixture of a solvent for (A) and a nonsolvent for (A) which is miscible with said solvent and which contains a carbonyl group, a carbonyl ester group, a thiocarbonyl group or a thiocarbonyl ester group, the solvent/nonsolvent weight ratio in mixture (3) being about 5/95 to about 12/88; and
(4) a mixture of a solvent for (A) and a ternary liquid which is miscible with said solvent and which contains (in each 100 parts by weight thereof) about 60–87 parts of methyl ethyl ketone, about 10–30 parts of water and about 3–10 parts of a volatile alcohol, the solvent/ternary liquid weight ratio in mixture (4) being about 2/98 to 70/30, the weight ratio of polymer (A) to liquid (B) in said composition being about 1/99 to 60/40.

The composition of this invention is sometimes referred to herein simply as "the dispersion." Articles containing a heat-resistant coating or bonding layer of polyimide polymer can be prepared by applying a layer of the dispersion to a suitable substrate by conventional liquid coating procedures, and heating the applied layer in an oven to evaporate the volatile liquid component and to convert the polyamic acid polymer to a polyimide polymer. The liquid component is "volatile" in the sense that it can be evaporated from the applied layer at a temperature below that which would be harmful to the polymer component. The liquid component can also be removed if desired by other known methods, for example by displacement.

The polyamic acid polymer of the liquid composition of this invention usually is one having recurring units of the formula

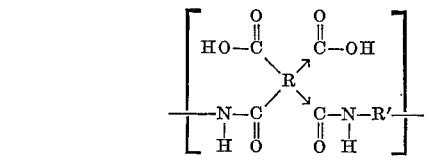

wherein → denotes isomerism; R is an organic tetravalent radical containing at least 2 carbon atoms, no more than 2 carbonyl groups of each polyamic acid until being attached to any one carbon atom of said tetravalent radical; and R' is a divalent radical containing at least 2 carbon atoms, each of the amide groups of adjacent polyamic acid units being attached to separate carbon atoms of said divalent radical. Preferably enough of these recurring units are present so that the polymer has an inherent viscosity of about 0.1 to 5.0 when measured as a 0.5% solution in N,N-dimethyl acetamide at 30° C. The useful polymers include those disclosed in U.S. Pats. 3,179,614; 3,179,633 and 3,179,634; the disclosures of these patents, particularly with respect to the useful reactants for preparation of the polymer, are incorporated herein by reference.

The olyamic acid polymer generally preferred in practicing this invention consists essentially of units of a dianhydride from the group consisting of 3,4,3',4'-benzophenonetetracarboxylic dianhydride and pyromellitic dianhydride and a diamine from the group consisting of 4,4'-oxydianiline, 4,4'-methylene dianiline and m-phenylene diamine. As commonly used in the art, "units of" herein means "units from the reaction of" the materials listed.

Another useful polyamic acid is a dimer formed by reacting trimellitic acid with half its equivalent weight of diamine; such a dimer can be converted to a polymer containing both imide and amide groups when subjected to sufficient heat.

Among the more useful solvents which can be employed in liquid components (3) and (4) of the dispersion as described above are N-methyl pyrrolidone, N,N-dimethyl acetamide, N,N-dimethyl formamide, dimethyl sulfoxide, pyridine and cresol. Other useful solvents include N,N-diethylformamide, N,N-diethylacetamide, N,N-dimethylmethoxy acetamide, N-methyl caprolactam, tetramethyl urea, a 90/10 mixture of acetone and water, dimethylsulfone, hexamethylphosphoramide, butyrolactam and the like. These liquid compounds can be used individually or in combination with each other, or in combination with other liquids which do not detract unduly from the characteristics of these solvents, for example such relatively poor solvents for the polymer as benzene, benzonitrile, xylene, toluene and cyclohexane.

A solvent portion is used in mixtures (3) and (4) which is capable of serving as a coalescing agent for the polymer and capable of permitting the formation of films or coatings from the dispersion which have satisfactory continuity and uniformity. A solvent is selected which (a) undergoes no harmful chemical reaction with the polymer of the dispersion or the reactants used to prepare the polymer, (b) is miscible with the other portion of the liquid component and (c) is capable of dissolving or swelling the polymer. A liquid is capable of swelling the polymer if the polymer particles increase in size significantly when mixed with the liquid by reason of absorption of the liquid. If there is no significant swelling or dissolving of the polymer particles when in contact with the liquid, the liquid is not suitable as a solvent or coalescing agent in the practice of this invention.

Liquid component (3) of the dispersion as described above contains a liquid which is a "nonsolvent" for the polymer; that is, a liquid which dissolves none of the polymer, or only very small amounts (e.g., about 0.5–5.0%), when a mixture of the polyamic acid and nonsolvent liquid is agitated for one hour at 25° C. The ternary liquid portion of liquid component (4) can also generally be considered a nonsolvent for the polymer, although in some cases it will dissolve more of the polymer than the nonsolvent portion of component (3). A nonsolvent liquid, or a ternary liquid, of the type described is selected which (a) is miscible with the solvent portion of the composition, (b) undergoes no harmful chemical reaction with the other ingredients of the composition, (c) preferably is more volatile than the solvent portion, and (d) is capable of dissolving about 5–100% by weight of the reactants used in carrying out the preparation of the polymer in the form of the novel dispersion in accordance with the process of this invention.

In some preferred embodiments of the dispersion, the liquid component consists essentially of the mixture described under (3) of the above description of the novel composition. An especially useful nonsolvent portion of such dispersions is acetone.

The groups mentioned in the description of the nonsolvent of component (3) of the dispersion have the formulas indicated below in Table 1, wherein there is also shown a typical liquid compound containing each type of group.

TABLE 1

| Group: | Formula | Typical compound |
|---|---|---|
| Carbonyl | $-\overset{O}{\underset{\|}{C}}-$ | Acetone. |
| Carbonyl ester | $-\overset{O}{\underset{\|}{C}}-O-$ | Ethyl acetate. |
| Thiocarbonyl | $-\overset{S}{\underset{\|}{C}}-$ | Thioacetone. |
| Thiocarbonyl ester | $-\overset{S}{\underset{\|}{C}}-O-$ | Methyl thionacetate. |

The liquids which can be used as all or part of the nonsolvent portion of component (3) include the following: ketones such as acetone, methyl ethyl ketone, diethyl ketone, ethyl propyl ketone, dipropyl ketone, diisopropyl ketone, methyl propyl ketone, methyl isopropyl ketone and methyl isobutyl ketone; diketones such as 2,4-pentanedione; cyclic ketones such as cyclohexanone; and aromatic ketones such as methyl phenyl ketone and benzophenone; and thiocarbonyl compounds corresponding to these ketones such as thioacetone; aliphatic esters such as alkyl acetates and alkyl acrylates containing less than 7 carbon atoms in the alkyl group; aromatic esters such as ethyl benzoate, phenyl acetate and dimethyl phthalate; and the corresponding compounds containing the thiocarbonyl ester group in place of the carbonyl ester group such as methylthionacetate. The carbonyl and thiocarbonyl compounds preferably contain less than 11 carbon atoms.

When the dispersion of this invention has a liquid component which consists essentially of the mixture described under (4) of the above description of the novel composition, preferably the ternary liquid portion thereof contains, on a 100 parts by weight basis, about 70–82 parts of methyl ethyl ketone, about 16–23 parts of water and about 3–7 parts of an aliphatic alcohol containing 1–5 carbon atoms (preferably ethanol), and the solvent/ternary liquid weight ratio therein is about 24/76 to 44/56; still more preferably the ternary liquid portion of such a dispersion contains (in 100 parts by weight thereof) about 75–77 parts of methyl ethyl ketone, about 18–20 parts of water and about 4–6 parts of ethanol.

Preferred embodiments of the dispersion described in the previous paragraph also have one or more of the following characteristics: the weight ratio of polymer (A) to liquid (B) is about 10/90 to 30/60; the solvent is N-methyl pyrrolidone; the polyamic acid polymer is the product of reacting pyromellitic dianhydride with 4,4'-oxydianiline.

The invention also provides a process for preparing a polyamic acid polymer dispersion which comprises reacting a dianhydride of a tetracarboxylic acid with a diamine in a liquid medium selected from the group consisting of (w) acetone;
(x) dimethylphthalate;
(y) a mixture of a solvent for said polymer and a nonsolvent for said polymer which is miscible with said solvent and which contains a carbonyl group, a carbonyl ester group, a thiocarbonyl group or a thiocarbonyl ester group, the solvent/nonsolvent weight ratio in mixture (y) being about 5/95 to about 12/88; and
(z) a single-phase ternary liquid mixture which contains (in each 100 parts by weight thereof) about 60–87 parts of methyl ethyl ketone, about 10–30 parts of water and about 3–10 parts of a volatile alcohol, preferably an aliphatic alcohol containing 1–5 carbon atoms.

A liquid medium is selected for carrying out the process which functions as a solvent for the diamine or the dianhydride, or a mixture of these reactants from which the polymer is formed. The liquid medium with which the reactants are mixed must be able to dissolve enough of at least one of the reactants to permit the polyamic acid polymer-forming reaction to take place. Usually at least 5% of the weight of at least one of the reactants present must be soluble in the liquid. Preferably both reactants have some solubility and at least one of the reactants (usually the diamine) has 50–100% solubility in the liquid medium, based on the weight of the reactant used. Thus, the liquid medium is a "solvent" for one or both of the reactants. Also, the liquid medium undergoes no harmful chemical reaction with either the reactants or the polymer being produced.

In a preferred embodiment of the process, the liquid medium is the one described under (z) in the above description of the process; and after reacting the dianhydride with the diamine, a solvent for the polymer is added to the composition in an amount such that the weight ratio of said solvent to medium (z) is about 2/98 to 70/30.

The dispersion of this invention can be prepared in accordance with the novel process described above, for example, by (1) dissolving about one mole of a suitable diamine in a suitable liquid medium (e.g., medium w, x, y or z as set forth above), (2) adding about one mole of a suitable dianhydride to the resulting solution with stirring, and (3) continuing to agitate the resulting mixture (e.g., at normal room temperature) until the reaction between the dianhydride and the diamine has gone to completion. The reaction is carried out at a temperature below 175° C., preferably below 60° C. The resulting polymer, as it is formed, disperses in the liquid medium to form a stable dispersion. It is not necessary to use equal molar amounts of the reactants, for example when some unreacted material is desired in the resulting dispersion. The dispersion can be ground in a pebble mill or the like if it is desired to improve its uniformity.

The order in which the components are added to the reaction vessel is not critical so long as intimate contact between reactants is achieved. Soluble components are conveniently added in the form of solutions, and compounds which are insoluble in the liquid or liquids utilized in any particular instance are desirably mixed with one of the liquids to form a slurry thereof and then added to the reaction mixture. Alternatively, solid reactants can simply be placed in a reaction vessel and the liquid used as the reaction medium added thereto with mixing.

The dispersions of this invention are usually thixotropic, and they can possess exceptionally high solids content compared to conventional polyamic acid solutions, making them useful in a wide number of applications where prior art solutions are not useful or can be used only with difficulty. These dispersions are particularly useful as adhesives because of their high solids content and the ease with which their fluidity can be controlled.

Additives known to be useful in liquid polymeric compositions can be added to the liquid composition of this invention in an amount that permits retention of the desired properties of the composition and dried polymer articles formed therefrom, for example pigments, dyes, fireproofing agents, curing agents, antisettling agents and small amounts of volatile liquids other than those listed above.

The liquid composition of this invention can have a surprisingly high polyamic acid content and still have a low enough viscosity to permit the use of a conventional liquid coating procedure, for example knife-coating, roller-coating, dip-coating and the like. A single coat of the high-solids composition of this invention sometimes suffices where two or three coats are necessary with a workable solution-type polyamic acid composition.

In many cases the dispersions of this invention can be stored for weeks and months with no significant settling or phase separation; and in some cases storage results in a concentration of the dispersion with phase separation between a lower dispersion phase and an upper fairly clear liquid layer. This characteristic of some of the dispersions permits an easy method for providing a higher solids dispersion than initially prepared. In some instances the solids concentration of the dispersion phase can be as much as 50% higher than that of the initial dispersion. Usefulness of the dispersion is not impaired by this concentration increase and phase separation, and the original solids concentration can be easily obtained by gently stirring to redisperse the solids throughout the entire liquid medium.

The examples which follow are given for the purpose of illustrating the invention. All quantities shown are on a weight basis unless otherwise indicated.

EXAMPLE 1

Twelve parts of methylene dianiline are charged to a reaction vessel containing 113 parts acetone at 25° C. and stirred until solution is effected. Thirteen parts of benzophenone tetracarboxylic acid dianhydride are agitated with the solution at 25° C. until the reaction between the polymer-forming reactants has gone to completion. A dispersion of the resulting polyamic-acid polymer having a solids content of about 21% is thereby produced.

The dispersion is applied in several stripes to a porous glass fabric which has been previously impregnated with a monomeric mixture containing one part benzophenone tetracarboxylic acid diester and 1.1 parts m-phenylene diamine, which mixture has been cured by heating until it is dry and non-tacky. The dispersion remains in the areas where it is placed, and it dries and coalesces at room temperature (25° C.) to form a uniform continuous film without spreading into adjacent areas and without penetrating the porous impregnated glass fabric unduly. Another similar impregnated glass fabric is superposed over the first impregnated glass fabric and the resulting sandwich is air dried for five minutes. The sandwich is then pressed together in a laboratory press at 15 p.s.i. for ten minutes at 177° C. to produce a laminate in which the lamella are very firmly adhered to each other where the stripes of dispersion had been applied. The adhesive strength is so strong that intermediate portions of lamella can be pulled apart without adversely affecting the adhered portions. A honeycomb-like structure is thereby formed which is useful in the construction of aircraft and the like where there is need for a construction material having a high strength-to-weight ratio.

EXAMPLE 2

The procedure of Example 1 is repeated with the exception that the acetone is replaced by a mixture of seven parts of N-methyl pyrrolidone and 100 parts methyl isobutyl ketone. The resulting dispersion is used to produce a similar honeycomb structure and with substantially the same results, the treated portions of the fabrics (the nodes) being extremely firmly adhered together.

EXAMPLE 3

A dispersion prepared according to Example 2 is cast upon a smooth substrate (e.g., a polished sheet of glass) and allowed to dry and coalesce at room temperature to a uniform film. The film is cured by heating it for 2 hours in a 250° C. oven; it is then peeled from the substrate in the form of an unsupported polyimide film, which is useful in high temperature electrical insulation applications.

EXAMPLE 4

A dispersion is prepared by mixing a slurry of 15.5 parts of benzophenone tetracarboxylic acid dianhydride in dimethyl o-phthalate with a slurry of 9.5 parts of methylene dianiline in dimethyl o-phthalate, the total amount of dimethyl-o-phthalate being 100 parts. Reaction to form the polyamic acid from these materials at 25° C. is almost instantaneous and results in a stable dispersion containing 20% polyamic acid by weight, the polymer having an inherent viscosity of 0.2 as measured in N-methyl pyrrolidone at 27° C. After the dispersion is ground in a ball mill for 24 hours and then cast upon a copper substrate, dried, and heated briefly in a 160° C. heat zone, the polymer coalesces and cures into a smooth uniform film of polyimide polymer.

EXAMPLE 5

A dispersion useful as a wire coating composition is prepared, and its utility is demonstrated, by (a) providing 525 ml. of a ternary liquid mixture consisting of 400 ml. methyl ethyl ketone, 100 ml. water and 25 ml. ethanol, (b) providing a slurry of 60 grams 4,4'-oxydianaline in 175 ml. of the ternary mixture described in step (a), (c) providing a slurry of 65 grams of pyromellitic dianhydride in 350 ml. of the mixture described in step (a), (d) while stirring, adding the slurry described in step (b) to the slurry described in step (c) at 25° C., (e) continuing to stir the slurry mixture while the temperature rises to 45° C. and until the polyamic acid polymer-forming reaction has been completed, (f) grinding the resulting polymer composition in a ball mill for one hour, (g) while stirring, adding 270 ml. of N-methyl pyrrolidone to the milled composition, (h) grinding the resulting polymer dispersion in a ball mill for 30 minutes, (i) coating copper wire with the dispersion by passing the wire at a speed of 45 feet per minute through a tank filled with the dispersion and then passing the dipped wire through a two-stage vertical oven to dry the coating at 150° C. and to cure the coating at 470° C. and (j) repeating step (i) until the resulting polyimide coating on the wire has a thickness of about 3 mils.

The polyimide coating on the wire is very tough, flexible, smooth, solvent resistant and heat resistant; and the coating has excellent dielectric properties.

EXAMPLE 6

A film-forming composition useful for the manufacture of heat-resistant electrical insulation materials is prepared by repeating steps (a) through (h) of Example 5 except the 25 ml. of ethanol in step (a) is replaced with 50 ml. of t-butyl alcohol.

EXAMPLE 7

A dispersion having a higher polymer content than that of Example 5, which is also useful as a wire coating composition, is prepared by (1) repeating steps (a) through (h) of Example 5, (2) subjecting the resulting composition to vacuum distillation until sufficient volatile liquid has been removed so that each 100 parts of the composition contains 25 parts of polymer and 75 parts of volatile liquid, and (3) adding to 100 parts of the resulting 25% solids composition 4.5 parts of a liquid aromatic hydrocarbon "paint solvent" having a boiling range of about 189–219° C. The purpose of the liquid hydrocarbon is to enhance the capacity of the dispersion to cure to a very smooth coating.

EXAMPLE 8

A polyimide film useful as a heat resistant electrical insulation material is prepared by (1) repeating steps (a) through (f) of Example 5, (2) while stirring, adding enough N-methyl pyrrolidone to the milled composition that the weight ratio of N-methyl pyrrolidone to ternary liquid in the resulting dispersion is 3/97, (3) casting the dispersion upon a polished sheet of glass, (4) allowing the layer of dispersion to dry and heating the film first in a 120° C. oven for 5 minutes and then in a 250° C. oven for 2 hours, and (5) peeling the resulting polyimide film from the glass substrate.

I claim:
1. As a new liquid composition, a dispersion of
   (A) a polyamic acid polymer in
   (B) a volatile liquid component consisting essentially of a mixture of a solvent for (A) and a ternary liquid which is miscible with said solvent and which contains (in each 100 parts by weight thereof) about 60–87 parts of methyl ethyl ketone, about 10–30 parts of water and about 3–10 parts of volatile alcohol, the solvent/ternary liquid weight ratio in said mixture being about 2/98 to 70/30; the weight ratio of polymer (A) to liquid (B) in said composition being about 1/99 to 60/40; and polymer (A) having recurring units of the formula

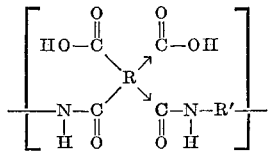

wherein → denotes isomerism; R is an organic tetravalent radical containing at least 2 carbon atoms, no more than 2 carbonyl groups of each polyamic acid unit being attached to any one carbon atom of said tetravalent radical; and R' is a divalent radical containing at least 2 carbon atoms, each of the amide groups of adjacent polyamic acid units being attached to separate carbon atoms of said divalent radical.

2. A composition according to claim 1 wherein the ternary liquid portion contains about 70–82 parts of methyl ethyl ketone, about 16–23 parts of water and about 3–7 parts of ethanol, and the solvent/ternary liquid weight ratio therein is about 24/76 to 44/56.

3. A composition according to claim 2 wherein said ternary liquid portion contains about 75–77 parts of methyl ethyl ketone, about 18–20 parts of water and about 4–6 parts of ethanol.

4. A composition according to claim 2 wherein the weight ratio of polymer (A) to liquid (B) is about 10/90 to 30/60.

5. A composition according to claim 2 wherein said solvent is N-methyl pyrrolidone.

6. A composition according to claim 2 wherein said polyamic acid polymer consists essentially of units of
   a dianhydride from the group consisting of 3,4,3',4'-benzophenonetetracarboxylic dianhydride and pyromelitic dianhydride and
   a diamine from the group consisting of 4,4'-oxydianiline, 4,4'-methylene dianiline and m-phenylene diamine.

7. A composition according to claim 1 wherein said solvent is selected from the group consisting of N-methyl pyrrolidone, N,N-dimethyl acetamide, N,N-dimethyl formamide, dimethyl sulfoxide, pyridine and cresol.

References Cited

UNITED STATES PATENTS

| | | | |
|---|---|---|---|
| 3,179,631 | 4/1965 | Endrey | 260—78 |
| 3,190,856 | 6/1965 | Lavin et al. | 260—29.2 |
| 3,347,808 | 10/1967 | Lavin et al. | 260—29.2 |

JOHN C. BLEUTGE, Primary Examiner

U.S. Cl. X.R.

117—72, 126, 128.4, 161, 232; 161—68, 93, 197; 260—30.2, 30.4, 30.8, 31.2, 31.8, 32.8, 33.4, 47, 65, 78